US006099761A

United States Patent [19]

Aoki et al.

[11] Patent Number: 6,099,761

[45] Date of Patent: Aug. 8, 2000

[54] PROCESS FOR PRODUCING SOLAR-CELL WATCH DIAL

[75] Inventors: Akio Aoki; Toshio Murata, both of Tanashi; Akira Azuma, Tokorozawa; Ikuo Kobayashi; Takao Saito, both of Miyota-machi, all of Japan

[73] Assignees: Citizen Watch Co., Ltd.; Cimeo Precision Co., Ltd., both of Japan

[21] Appl. No.: 09/209,332

[22] Filed: Dec. 11, 1998

Related U.S. Application Data

[62] Division of application No. 08/817,747, filed as application No. PCT/JP95/02158, Oct. 20, 1995, Pat. No. 6,021,099.

[30] Foreign Application Priority Data

Oct. 21, 1994 [JP] Japan ........................................ 257069

[51] Int. Cl.[7] ................................ B29D 11/00; G02B 1/00

[52] U.S. Cl. ......................... 264/1.21; 264/654; 264/662; 264/663

[58] Field of Search .................................... 264/1.21, 654, 264/662, 663

[56] References Cited

U.S. PATENT DOCUMENTS

| | | | |
|---|---|---|---|
| 4,948,538 | 8/1990 | Wei et al. | 264/6 |
| 4,968,459 | 11/1990 | Serntz | 264/1.21 |
| 5,242,298 | 9/1993 | Sernetz | 433/2 |
| 5,627,116 | 5/1997 | Zuk | 264/1.21 |
| 5,761,158 | 6/1998 | Azuma et al. | 368/205 |

FOREIGN PATENT DOCUMENTS

| | | |
|---|---|---|
| 0242088 | 10/1987 | European Pat. Off. . |
| 60-148172 | 8/1985 | Japan . |
| 538464 | 6/1993 | Japan . |
| 7244174 | 9/1995 | Japan . |

OTHER PUBLICATIONS

Japanese Patent Publication No. 56163266 Abstract, Dec. 15, 1981, 1. p., English–language.

Swiss Patent No. 522 247, Nov. 30, 1971, page 1 only, Swiss language.

*Primary Examiner*—Christopher A. Fiorilla
*Attorney, Agent, or Firm*—Webb Ziesenheim Lodgson Orkin & Hanson, P.C.

[57] ABSTRACT

A solar-cell watch dial to be disposed on or above a solar cell housed in a watch, the solar-cell watch dial including an alumina of the formula $Al_2O_3$ whose purity is at least 99.90% and exhibiting a light transmission ranging from 40 to 60%. The invention also includes a process for producing a solar-cell watch dial, which includes the steps of: mixing together an alumina of the formula $Al_2O_3$ whose purity is at least 99.90%, an organic binder and water to thereby obtain an $Al_2O_3$ mixture (A); drying and granulating the $Al_2O_3$ mixture to thereby obtain a granular material (B); molding the granular material into a plate dial precursor (C); firing the dial precursor at 700 to 1500° C. in atmospheric environment to thereby obtain a preliminary firing product (D); and firing the preliminary firing product at 1500 to 1800° C. under a pressure of $1\times10^{-2}$ to $1\times10^{-5}$ torr for 1 to 10 hr to thereby obtain a solar-cell watch dial (E). The solar-cell watch dial of the present invention enables preventing the solar cell from being sighted from outside without hindering the supply of light energy to the solar cell.

4 Claims, 2 Drawing Sheets

PROCESS FOR PRODUCING SOLAR-CELL WATCH DIAL

RELATED APPLICATION

This application is a divisional application of U.S. Ser. No. 08/817,747, filed Apr. 18, 1997 now U.S. Pat. No. 6,021,099 which is a 371 of PCT/JP95/02158 filed Oct. 20, 1995.

FIELD OF THE INVENTION

The present invention relates to a dial for use in a solar-cell watch.

PRIOR ART

The solar cell has long been used as a power source in, for example, watches, electronic calculators and portable radios. The solar cell is commonly formed of amorphous silicon or the like and converts light energy to electric energy. For accomplishing its functions, the solar cell must be disposed in a light receiving area, namely, a surface area which is directly sighted from outside. However, the solar cell is generally brown or dark-blue, so that, for example, the dial also must be brown or dark-blue. Therefore, a watch having a power source which relies on the solar cell has very limited freedom in the design including the tone of the watch.

A watch in which an interference filter or the like is provided on the frontal surface of a solar cell so that directly sighting of the solar cell is prevented has been proposed for coping with the above problem. However, the proposed watch has encountered the problems that the supply of light energy to the solar cell is hindered and that the watch dial has poor appearance quality.

In the efforts toward solving these problems, for example, Japanese Patent Publication No. 5(1993)-38464 discloses a colored solar cell comprising a solar cell and a color diffusion layer, this color diffusion layer comprising a color filter provided on the frontal surface of the solar cell and capable of transmitting radiations of the wavelength range contributory to the power generation of the solar cell and a scattering layer provided between the solar cell and the color filter and capable of transmitting part of the light having passed through the color filter while scattering the rest of the light in all directions. It is described that, in the preparation of a white diffusion plate, the scattering layer is formed of a milky acrylic plate, a half mirror coated with a delustering clear lacquer, a one-side roughened glass or plastic having a mirror of, for example, aluminum provided on the other side or the like. However, the milky acrylic plate not only suffers from burring at the time of working to thereby necessitate deburring with the result that a cost increase is caused but also has a drawback in that a thermal deformation is caused by the exposure thereof to direct sunlight for a prolonged period of time. Further, the half mirror coated with a delustering clear lacquer and the one-side roughened glass or plastic having a mirror of, for example, aluminum provided on the other side encounter the problem that the film thickness is so irregular that the light transmission is dispersed to thereby invite color shading. Moreover, all of the above materials disadvantageously have poor appearance quality in the use as a watch dial.

In Japanese Patent Application No. 6(1994)-32463, the same inventor proposed a watch equipped with a dial comprising a solar cell and a covering member having level differences and recessed channels on its back. In this covering member, level differences and recessed channels of minute pitches are formed at equal intervals on one side of a ceramic plate so that light is irregularly reflected to thereby make it difficult to sight the solar cell arranged on the lower side of the covering member. However, this covering member can be fabricated only with the use of high precision working jigs.

The present invention has been made taking the above current situation into account. Thus, an object of the present invention is to provide a solar-cell watch dial which can prevent the solar cell from being sighted from outside and which does not hinder the supply of light energy to the solar cell. Another object of the present invention is to provide a solar-cell watch dial which can diversify the design of the solar-cell watch.

SUMMARY OF THE INVENTION

The solar-cell watch dial of the present invention is disposed on or above a solar cell housed in a watch, comprises an alumina of the formula $Al_2O_3$ whose purity is at least 99.90% and exhibits a light transmission ranging from 40 to 60%.

In the present invention, it is preferred that the solar-cell watch dial have a white tone, that the solar-cell watch dial have a surface roughness (Ra) ranging from 0.01 to 2 $\mu$m and that the solar-cell watch dial have locking protrusions, notches or holes.

The solar-cell watch dial of the present invention exhibits a light transmission ranging from 40 to 60%, so that sighting the solar cell from outside can be prevented without hindering the supply of light energy to the solar cell. Further, the solar-cell watch dial of the present invention can diversify the design of the solar-cell watch. Especially, when the solar-cell watch dial has a white tone, the design of the solar-cell watch can be diversified in greater extent.

The process for producing a solar-cell watch dial according to the present invention comprises the steps of:

mixing together an alumina of the formula $Al_2O_3$ whose purity is at least 99.90%, an organic binder and water to thereby obtain an $Al_2O_3$ mixture (A);

drying and granulating the $Al_2O_3$ mixture to thereby obtain a granular material (B);

molding the granular material into a plate dial precursor (C);

firing the dial precursor at 700 to 1500° C. in atmospheric environment to thereby obtain a preliminary firing product (D); and firing the preliminary firing product at 1500 to 1800° C. under a pressure of $1\times10^{-2}$ to $1\times10^{-5}$ torr for 1 to 10 hr to thereby obtain a solar-cell watch dial (E).

In the present invention, a post-firing step comprising firing the solar-cell watch dial at 800 to 1800° C. in atmospheric environment (F) may be conducted subsequent to the above step (E). Further, a grinding/polishing step comprising grinding and/or polishing the solar-cell watch dial at its surface (G), a cleaning step comprising cleaning the solar-cell watch dial (H) and the post-firing step (F) may be conducted subsequent to the above post-firing step (F).

Still further, the grinding/polishing step (G), the cleaning step (H) and the post-firing step (F) may be conducted subsequent to the above step (E).

These processes of the present invention enable producing the solar-cell watch dial of the present invention comprising an alumina of the formula $Al_2O_3$ whose purity is at least 99.90% and exhibiting a light transmission ranging from 40 to 60%.

DETAILED DESCRIPTION OF THE PREFERRED EMBODIMENTS

Figure 1A:
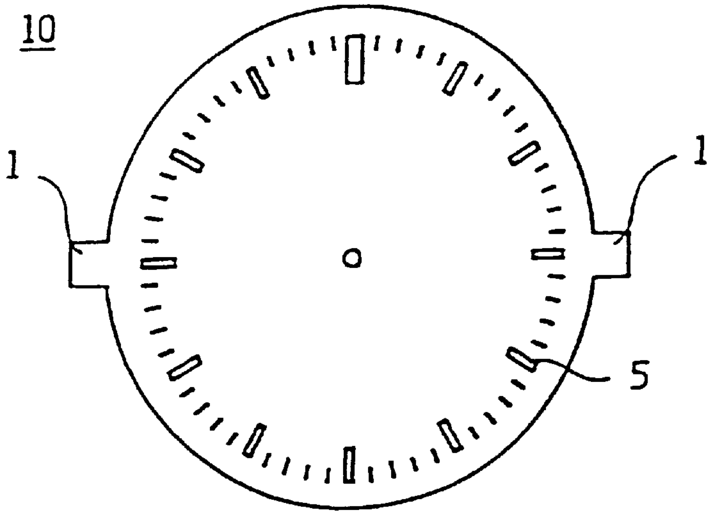
FIGS. 1 (A) to (C) are schematic diagrams showing forms of the solar-cell watch dial of the present invention.

The solar-cell watch dial of the present invention comprises an alumina of the formula $Al_2O_3$ whose purity is at least 99.90%, preferably, at least 99.99% and exhibits a light transmission ranging from 40 to 60%, preferably, from 50 to 60%.

In the present invention, it is preferred that the solar-cell watch dial have a white tone.

When the purity of the alumina of the formula $Al_2O_3$ constituting the solar-cell watch dial is in the above range, neither is the light transmission of the solar-cell watch dial lowered by the absorption of light by impurities nor the solar-cell watch dial is colored during the production thereof. Further, when the light transmission is in the above range, not only can the color of the solar cell be satisfactorily hidden but also the supply of light energy to the solar cell is not hindered by the solar-cell watch dial.

In the present invention, the light transmission is determined from the quantity of electricity generated in the solar cell by the light having passed through the solar-cell watch dial. That is, the light transmission is the percentage of $A_1$ to $A_0$, wherein $A_0$ is the value of electricity obtained by conversion of light energy to electric energy effected when the solar cell disposed at a predetermined distance from a light source is irradiated with light in an apparatus in which no external light is inserted and $A_1$ is the value of electricity obtained in the same manner as above except that the solar-cell watch dial is mounted on the upper surface of the solar cell.

In the present invention, the white tone means at least 75 in terms of lightness index (L*) in the CIE 1976 (L*a*b*) color space defined by the International Illumination Committee (CIE). Table 1 lists the lightness index (L*) measured by a color difference meter of each of the five prepared dial samples of 500 μm in thickness having a surface roughness (Ra) of 0.4 μm and five prepared dial samples of the same thickness having a surface roughness (Ra) of 0.02 μm. The above measurement of the lightness index (L*) of each of the dial samples was conducted according to the material color measuring method based on the 0-degree visual field XYZ system with the use of color difference meter SM-2-SCH (integrating sphere method, measured by reflection, measuring aperture: 12 mm) manufactured by Suga Test Instruments Co., Ltd.

TABLE 1

| | Lightness index (L*) of dial sample | |
|---|---|---|
| Sample No. | Surface roughness (Ra) 0.4 μm | Surface roughness (Ra) 0.02 μm |
| 1 | 85.48 | 79.42 |
| 2 | 84.52 | 77.92 |
| 3 | 86.10 | 79.43 |

TABLE 1-continued

| | Lightness index (L*) of dial sample | |
|---|---|---|
| Sample No. | Surface roughness (Ra) 0.4 μm | Surface roughness (Ra) 0.02 μm |
| 4 | 86.42 | 78.46 |
| 5 | 84.98 | 77.60 |
| Average | 85.50 | 78.57 |

The above solar-cell watch dial of the present invention is preferred to have a surface roughness (Ra) ranging from 0.01 to 2 μm, especially, from 0.02 to 1 μm as measured by a surface roughness meter of the tracer type. When the surface roughness is less than 0.01 μm, the solar-cell watch dial would have a glossy white tone with the result that the light transmission would be lowered. On the other hand, when the surface roughness exceeds 2 μm, the scattered light would increase to thereby darken the white tone with the result that the light transmission would be lowered. Moreover, as apparent from the above Table 1, the lightness index (L*) of the solar-cell watch dial may change depending on the surface roughness thereof. In the above measurement, the surface roughness of the solar-cell watch dial was performed with the use of surface roughness meter of the tracer type (Surfpak manufactured by Mitsutoyo Corporation). The meter is, however, not limited thereto and use can be made of a surface roughness meter of the non-tracer type, for example, an optical surface roughness meter.

The terminology "surface roughness (Ra)" used herein means the central average roughness defined in Japanese Industrial Standard (JIS) B 0601.

Although the thickness of the solar-cell watch dial is not particularly limited as long as the light transmission of the solar-cell watch dial is in the range of 40 to 60%, it is preferred that the above thickness range generally from 200 to 1000 μm, especially, from 400 to 600 μm and, still especially, from 450 to 550 μm.

Figure 1B:
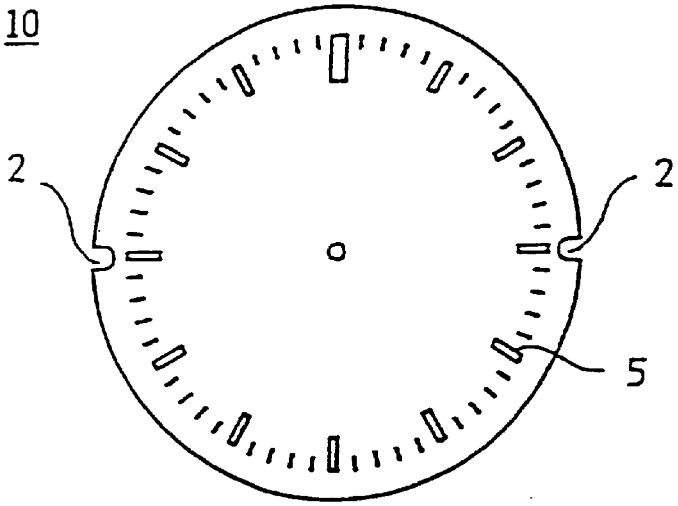
Figure 1C:
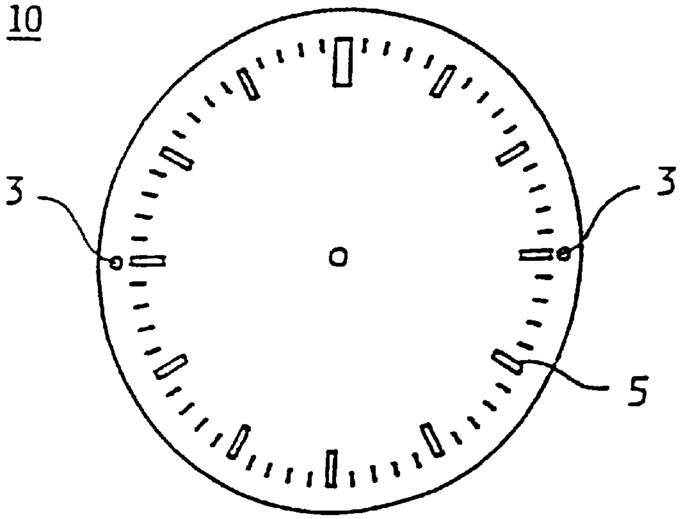

The solar-cell watch dial of the present invention preferably has locking protrusions, notches or holes at its circumference as shown in FIGS. 1 (A) to (C).

The solar-cell watch dial 10 shown in FIG. 1 (A) has nearly rectangular protrusions 1 formed at mutually symmetrical positions of its circumference and is provided with time graduations 5 such as Roman numerals in the vicinity of the circumference of the solar-cell watch dial.

The solar-cell watch dial 10 shown in FIG. 1 (B) has nearly semicircular notches 2 formed at mutually symmetrical positions of its circumference and is provided with time graduations 5 such as Roman numerals in the vicinity of the circumference of the solar-cell watch dial. The solar-cell watch dial 10 shown in FIG. 1 (C) has nearly circular holes 3 formed at mutually symmetrical positions in the vicinity of its circumference and is provided with time graduations 5 such as Roman numerals in the vicinity of the circumference of the solar-cell watch dial. Although each of the solar-cell watch dials of FIG. 1 has only one member selected from among a protrusion, a notch and a hole, the solar-cell watch dial of the present invention may be provided with a combination of at least two members selected from among the above. Further, although two protrusions, two notches or two holes are disposed at mutually symmetrical positions, the solar-cell watch dial of the present invention may be provided with at least three thereof. In this instance, the protrusions, notches or holes may be disposed at mutually asymmetrical positions.

Figure 2A:
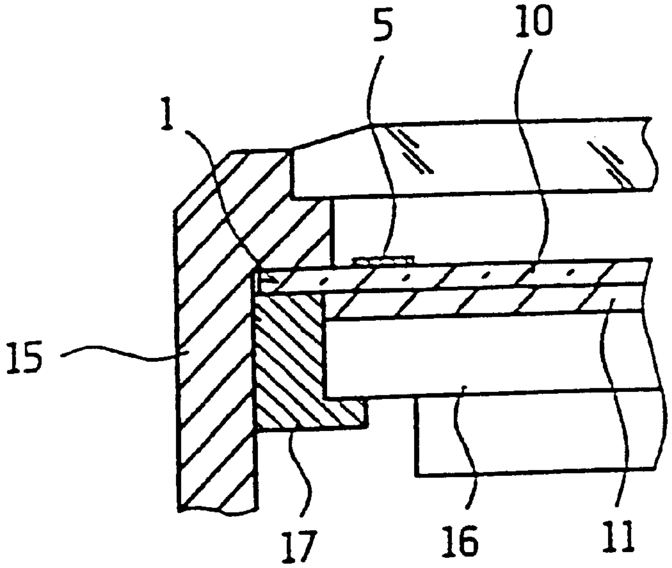
FIG. 2 (A) is a schematic partial sectional view of one form of solar-cell watch in which the solar-cell watch dial of the present invention is employed, and FIG. 2 (B) is a partial view of a region of FIG. 2 (A) in which a protrusion of the solar-cell watch dial and a support frame are fitted together.
Figure 2B:
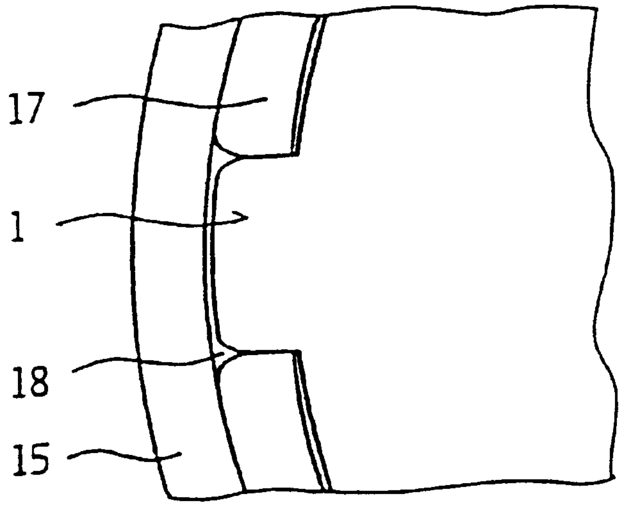

The solar-cell watch dial 10 of the present invention can be fixed in the main body of the watch by means of the above protrusions 1, notches 2 or holes 3. For example, when the solar-cell watch dial 10 is provided with protrusions 1, it is fixed in the main body of the watch by the fitting of each protrusion 1 in a recess 18 formed at an upper part of a support frame 17 as illustrated in FIGS. 2 (A) and (B). In this fitting, the upper surface of the solar-cell watch dial 10 is on substantially the same level as the upper surface of the support frame 17. In FIG. 2, numeral 11 denotes a solar-cell substrate, numeral 15 a watchcase and numeral 16 a module.

The above solar-cell watch dial of the present invention can be produced by, for example, the process including the following steps (A) to (F).

$Al_2O_3$ mixture preparing step (A)

In this step, $Al_2O_3$ (alumina), an organic binder and water are mixed together to thereby obtain an $Al_2O_3$ mixture. This mixing can be conducted in, for example, a crusher such as a trommel.

In the mixing of $Al_2O_3$, an organic binder and water, water is used in an amount of 1 to 8 parts by weight, preferably, 2 to 5 parts by weight and, still preferably, 3 to 4 parts by weight per part by weight of the organic binder. The organic binder and water are used in a total amount of 50 to 90 parts by weight, preferably, 60 to 80 parts by weight and, still preferably, 70 to 75 parts by weight per 100 parts by weight of $Al_2O_3$.

The alumina of the formula $Al_2O_3$ used in the present invention is preferred to have a purity of at least 99.90%, especially, at least 99.99%. It is preferred that $Al_2O_3$ have a grain size of 0.05 to 10 $\mu$m, especially, 0.1 to 1.0 $\mu$m and, still especially, 0.1 to 0.3 $\mu$m.

The organic binder is, for example, polyvinyl alcohol, polyethylene oxide, polyethylene glycol, glycerol, stearic acid or an acrylic. Of these, polyvinyl alcohol and polyethylene oxide are preferred.

Drying/granulating step (B)

In this step, the $Al_2O_3$ mixture is dried and granulated to thereby obtain a granular material of $Al_2O_3$.

The drying and granulation of the $Al_2O_3$ mixture can be effected by the use of, for example, a spray dryer.

The resultant granular material is preferred to have a grain size ranging from 30 to 150 $\mu$m, especially, from 60 to 80 $\mu$m. The grain size of the granular material can be regulated by, for example, sieving.

Molding step (C)

In this step, the above granular material is molded into a plate dial precursor.

The molding for obtaining the dial precursor can be effected by, for example, pressing under a pressure of 500 to 2000 kg/cm$^2$, preferably, 700 to 1000 kg/cm$^2$.

The thus obtained dial precursor is preferred to have a thickness ranging from 800 to 1200 $\mu$m, especially, from 1000 to 1100 $\mu$m and a density ranging from 3.60 to 3.99 g/cm$^3$, especially, from 3.90 to 3.95 g/cm$^3$.

Preliminary firing step (D)

In this step, the above dial precursor is fired in the air to thereby obtain a preliminary firing product. This preliminary firing step removes the organic binder. The firing temperature ranges from 700 to 1500° C., preferably, from 800 to 1400° C. Although depending on the firing temperature, the firing time generally ranges from 10 to 30 hr, preferably, from 10 to 20 hr. The firing time can be shortened when the firing temperature is high and can be prolonged when the firing temperature is low. Further, the firing temperature may be changed within the above range during the firing step.

When the firing temperature is within the above range, the obtained solar-cell watch dial is free of color shading.

Main firing step (E)

In this step, the above preliminary firing product is fired under a pressure of $1\times10^{-2}$ to $1\times10^{-5}$ torr, preferably, $5\times10^{-3}$ to $1\times10^{-5}$ torr and, still preferably, $1\times10^{-3}$ to $1\times10^{-5}$ torr to thereby obtain a solar-cell watch dial. The firing temperature ranges from 1500 to 1800° C., preferably, from 1600 to 1800° C. and, still preferably, 1700 to 1800°0 C. Although depending on the firing temperature, the firing time generally ranges from 1 to 10 hr, preferably, from 1 to 5 hr and, still preferably, 1 to 3 hr. The firing time can be shortened when the firing temperature is high and can be prolonged when the firing temperature is low.

When the degree of evacuation during firing and the firing temperature are within the above ranges, the obtained solar-cell watch dial exhibits a satisfactory light transmission and has a white tone.

When the firing time is too short, the obtained solar-cell watch dial may be irregular in the light transmission. On the other hand, when the firing time is too long, the obtained solar-cell watch dial occasionally has poor strength.

The thus obtained solar-cell watch dial generally has a light transmission of about 45 to 60%, preferably, about 50 to 60%. Further, the obtained solar-cell watch dial has a white tone. It is preferred that the obtained solar-cell watch dial generally have a surface roughness (Ra) ranging from 0.01 to 2 $\mu$m, especially, from 0.02 to 1 $\mu$m and that the thickness thereof generally range from 400 to 600 $\mu$m, especially, from 450 to 550 $\mu$m. Further, it is preferred that the density of the solar-cell watch dial ranges from 3.90 to 3.95 g/cm$^3$.

When steps such as the below described post-firing step (F) and grinding/polishing step (G) ensue the main firing step (E), the light transmission, surface roughness (Ra) and thickness of the solar-cell watch dial may fall outside the above ranges.

In the present invention, the below described post-firing step (F) may be conducted subsequent to the above main firing step (E). Further, the below described grinding/polishing step (G), cleaning step (H) and post-firing step (F) may be conducted subsequent to the above post-firing step (F). Still further, the below described grinding/polishing step (G), cleaning step (H) and post-firing step (F) may be conducted subsequent to the above step (E).

Post-firing step (F)

In this step, the solar-cell watch dial having undergone the above main firing step (E) or the below described cleaning step (H) is fired in the air. The firing temperature ranges from 800 to 1800° C., preferably, from 1200 to 1700° C. and, still preferably, 1400 to 1600° C. Although depending on the firing temperature, the firing time generally ranges from 30 to 180 min, preferably, from 60 to 150 min and, still preferably, 90 to 120 min. The firing time can be shortened when the firing temperature is high and can be prolonged when the firing temperature is low. For example, the post-firing can be conducted at 1500 to 1800° C. for 30 to 60 min or at 800 to 1200° C. for 90 to 120 min.

When the firing temperature is within the above range, the obtained solar-cell watch dial exhibits a satisfactory light transmission, has a white tone and is very strong.

When the firing time is too short, the obtained solar-cell watch dial may have a black tone.

The light transmission and tone of the solar-cell watch dial can be regulated by the post-firing.

Grinding/polishing step (G)

The grinding and/or polishing of the solar-cell watch dial can be conducted by the use of, for example, a grindstone of 200 to 2000# in grain size, an abrasive of substantially the same grain size or a combination thereof. Not only the surface roughness and thickness of the solar-cell watch dial but also the light transmission and lightness index thereof can be regulated by grinding and/or polishing the surface of the solar-cell watch dial.

It is preferred that the solar-cell watch dial having undergone the above grinding and/or polishing have a thickness ranging from 400 to 600 $\mu$m, especially, from 450 to 550 $\mu$m.

In the present invention, barreling or honing may be conducted subsequent to the above grinding and/or polishing. Of them, barreling is preferred.

Barreling is carried out in, for example, the following manner. That is, the solar-cell watch dial having undergone the above grinding and/or polishing step, medium such as copper ball and grindstone of about #600 in grain size (for example, silicon carbide (GC)) are placed in a barreling machine of the vibration type and the machine is operated for 0.5 to 2 hr to thereby effect polishing.

The barreling and honing enable reducing the surface roughness of the solar-cell watch dial and enable chamfering any corner of, for example, the circumferential part of the solar-cell watch dial.

In this grinding/polishing step (G), it is preferred that the solar-cell watch dial be ground and/or polished so that the surface roughness (Ra) ranges from 0.01 to 2 $\mu$m, especially, from 0.02 to 1 $\mu$m.

Cleaning step (H)

In the present invention, when the above grinding/polishing step (G) has been carried out, the solar-cell watch dial having undergone the step (G) is cleaned.

In the cleaning of the solar-cell watch dial, a method is employed in which the solar-cell watch dial is immersed in, for example, a boiling mixture of sulfuric acid and hydrochloric acid or a boiling nitric acid, washed with an organic cleaning agent according to necessity, washed with water, alcohol or the like and dried.

When barreling using copper balls has been carried out in the above grinding/polishing step (G), it is preferred that the solar-cell watch dial be immersed in a boiling nitric acid, washed with water, alcohol or the like and dried.

In the present invention, the light transmission and/or surface roughness (Ra) of the solar-cell watch dial can be regulated by repeating the above grinding/polishing step (G), cleaning step (H) and post-firing step (F) for the solar-cell watch dial obtained in the above manner.

The above process enables producing the solar-cell watch dial comprising an alumina of the formula $Al_2O_3$ whose purity is at least 99.90% and exhibiting a light transmission ranging from 40 to 60%.

The solar-cell watch dial of the present invention enables preventing the solar cell from being sighted from outside and enables suppressing the adverse effect on the supply of light energy to the solar cell. Moreover, the solar-cell watch dial of the present invention can increase the color variation of the dial of a solar-cell watch, thereby enabling diversification of the design of the watch.

What is claimed is:

1. A process for producing a solar-cell watch dial, which comprises the steps of:

(A) mixing together an alumina of the formula $Al_2O_3$ whose purity is at least 99.90%, an organic binder and water to thereby obtain an $Al_2O_3$ mixture;

(B) drying and granulating the $Al_2O_3$ mixture to thereby obtain a granular material;

(C) molding the granular material into a plate dial precursor;

(D) firing the dial precursor at 700 to 1500° C. in atmospheric environment to thereby obtain a preliminary firing product; and (E) firing the preliminary firing product at 1500 to 1800° C. under a pressure of $1\times10^{-2}$ to $1\times10^{-5}$ torr for 1 to 10 hr to thereby obtain a solar-cell dial.

2. The process as claimed in claim 1, which further comprises a step (F) of firing the solar-cell watch dial at 800 to 1800° C. in atmospheric environment subsequent to the step (E).

3. The process as claimed in claim 2, which further comprises the steps of:

(G) grinding and/or polishing the solar-cell watch dial at its surface;

(H) cleaning the solar-cell watch dial; and (I) firing the solar-cell watch dial at 800 to 1800° C. in atmospheric environment subsequent to the step (F).

4. The process as claimed in claim 1, which further comprises the steps of (F) grinding and/or polishing the solar-cell watch dial at its surface;

(G) cleaning the solar-cell watch dial; and (H) firing the solar-cell watch dial at 800 to 1800° C. in atmospheric environment subsequent to the step (E).

* * * * *

UNITED STATES PATENT AND TRADEMARK OFFICE

CERTIFICATE OF CORRECTION

PATENT NO. : 6,099,761

DATED : August 8, 2000

INVENTOR(S) : Akio Aoki et al.

It is certified that error appears in the above-identified patent and that said Letters Patent is hereby corrected as shown below:

Title Page, [56] References Cited, under U.S. PATENT DOCUMENTS, refer to second reference, "Serntz" should read --Sernetz--.

Column 6 Line 7 "1800°0C" should read --1800°C--.

Signed and Sealed this

Twenty-second Day of May, 2001

*Attest:*

NICHOLAS P. GODICI

*Attesting Officer*

*Acting Director of the United States Patent and Trademark Office*